US011494404B2

(12) United States Patent
Ekbom

(10) Patent No.: US 11,494,404 B2
(45) Date of Patent: Nov. 8, 2022

(54) DATA SYNCHRONIZATION IN A DISTRIBUTED DATA STORAGE SYSTEM

(71) Applicant: T2 Data AB, Kista (SE)

(72) Inventor: Mikael Ekbom, Åkersberga (SE)

(73) Assignee: T2 Data AB, Kista (SE)

( * ) Notice: Subject to any disclaimer, the term of this patent is extended or adjusted under 35 U.S.C. 154(b) by 292 days.

(21) Appl. No.: 16/925,197

(22) Filed: Jul. 9, 2020

(65) Prior Publication Data

US 2020/0342002 A1 Oct. 29, 2020

Related U.S. Application Data

(62) Division of application No. 15/779,044, filed as application No. PCT/EP2016/078464 on Nov. 22, 2016, now Pat. No. 10,877,991.

(30) Foreign Application Priority Data

Nov. 24, 2015 (SE) .................................... 1551528-1

(51) Int. Cl.
*G06F 16/00* (2019.01)
*G06F 16/27* (2019.01)
(Continued)

(52) U.S. Cl.
CPC .......... *G06F 16/27* (2019.01); *G06F 11/1662* (2013.01); *G06F 16/178* (2019.01);
(Continued)

(58) Field of Classification Search
CPC .... G06F 16/178; G06F 16/27; G06F 16/2358; G06F 16/2322; G06F 16/2329; G06F 2201/84; G06F 11/1662; H04L 67/1097
See application file for complete search history.

(56) References Cited

U.S. PATENT DOCUMENTS 6,529,921 B1 3/2003 Berkowitz et al.
7,577,691 B2 8/2009 Novik et al.
(Continued)

OTHER PUBLICATIONS

Kim et al., "Efficient Distributed Simulation of Hierarchical DEVS Models: Transforming Model Structure into a Non-Hierarchical One," IEEE, 2000, pp. 227-233. (Year: 2000).*

(Continued)

*Primary Examiner* — Cheryl Lewis
(74) *Attorney, Agent, or Firm* — Davis Wright Tremaine LLP

(57) ABSTRACT

The present disclosure relates to a method in a distributed and non-hierarchical node comprising a set of data items for determining a synchronization state between said node and one or more distributed and non-hierarchical nodes communicatively coupled to form a cluster, wherein the set of data items are locally replicated at each node. The method comprises generating a snapshot comprising information relating to the set of data items at a snapshot time $T_s$, said information identifying changes to the data items where each change comprises a time stamp, where only changes to the data items with a time stamp$<T_0$, where $T_s>T_0$, are included in the snapshot, although changes to the data items up to the time $T_s$, have been received and stored in the nodes, receiving corresponding generated snapshots from all other nodes in the cluster, and determining a synchronization state based on a comparison between the generated and received snapshots. The synchronization state is determined to be not synchronized if the generated snapshot and the received corresponding snapshots do not all match.

9 Claims, 11 Drawing Sheets

(51) Int. Cl.
  *G06F 16/23* (2019.01)
  *G06F 16/178* (2019.01)
  *G06F 11/16* (2006.01)
  *H04L 67/1097* (2022.01)

(52) U.S. Cl.
  CPC ...... *G06F 16/2322* (2019.01); *G06F 16/2329* (2019.01); *G06F 16/2358* (2019.01); *H04L 67/1097* (2013.01); *G06F 2201/84* (2013.01)

(56) References Cited

U.S. PATENT DOCUMENTS

| | | | |
|---|---|---|---|
| 7,912,633 | B1 | 3/2011 | Dietsch et al. |
| 10,091,249 | B2* | 10/2018 | Imbimbo ................. G06F 21/64 |
| 10,671,672 | B1* | 6/2020 | Eksombatchai ... G06Q 30/0201 |
| 2005/0165858 | A1 | 7/2005 | Tom et al. |
| 2007/0014314 | A1 | 1/2007 | O'Neil |
| 2008/0168183 | A1 | 7/2008 | Marcy et al. |
| 2008/0222212 | A1 | 9/2008 | Prasad et al. |
| 2013/0138615 | A1 | 5/2013 | Gupta et al. |
| 2013/0304700 | A1 | 11/2013 | Nicklin |
| 2014/0098101 | A1* | 4/2014 | Friedlander ........... G06T 11/206 345/440 |
| 2014/0122718 | A1* | 5/2014 | Thoppai ................ G06F 16/273 709/225 |
| 2016/0182630 | A1* | 6/2016 | Thoppai .................... G06F 9/52 707/620 |
| 2018/0341691 | A1 | 11/2018 | Ekbom |

OTHER PUBLICATIONS

Choi et al., "A Database Synchronization Algorithm for Mobile Devices," IEEE Transactions on Consumer Electronics 56(2):392-398, May 2010.
Du et al., "Clock-SI: Snapshot Isolation for Partitioned Data Stores Using Loosely Synchronized Clocks," IEEE 32nd International Symposium on Reliable Distributed Systems, Sep. 30, 2013, pp. 173-184.
Extended European Search Report dated Nov. 20, 2019, Patent Application No. 19196137.4, 10 pages.
Guo et al., "An Effective Tile Caching Mechanism of UAV Remote Sensing Map Based on Hilbert Coding Index," 2019 IEEE 11th International Conference on Communication Software and Networks (ICCSN), Jun. 12, 2019, 7 pages.
International Search Report and Written Opinion dated Mar. 7, 2017, International Patent Application No. PCT/EP2016/078464, filed Nov. 22, 2016, 11 pages.
International Search Report dated Aug. 25, 2020, in International Patent Application No. PCT/EP2020/066105, filed Jun. 10, 2020, 5 pages.
Kraak et al., "Visualization of Spatial Data's Temporal Component", Proceedings Spatial Data Handling Advances in GIS Research, Sep. 5, 1994, 12 pages.
Poorazizi et al., "Developing a Mobile GIS for Field Geospatial Data Acquisition," WSEAS International Conference on Urban Planning and Transportation (UPT '07), Jul. 22, 2018, 5 pages.
Written Opinion of the International Searching Authority dated Aug. 25, 2020, in International Patent Application No. PCT/EP2020/066105, filed Jun. 10, 2020, 6 pages.
Zhao et al., "Synchronization of Dynamical Networks With Non-identical Nodes: Criteria and Control," IEEE Transactions On Circuits And Systems-I: Regular Papers, 58(3):584-594, Mar. 2011.

* cited by examiner

51 Create

| EID | Content | VID (optional) | Timestamp | Deleted (optional) |
|---|---|---|---|---|
| F4241 | 1 | 1 | 8:28:27.32 | FALSE |

52 Update

| EID | Content | VID (optional) | Timestamp | Deleted (optional) |
|---|---|---|---|---|
| F4241 | 0 | 2 | 10:52:12.89 | FALSE |

53 Delete

| EID | Content | VID (optional) | Timestamp | Deleted (optional) |
|---|---|---|---|---|
| F4241 | 0 | 2 | 11:28:27.32 | TRUE |

DATA SYNCHRONIZATION IN A DISTRIBUTED DATA STORAGE SYSTEM

CROSS-REFERENCE TO RELATED APPLICATION

This application is a divisional of U.S. application Ser. No. 15/779,044 filed May 24, 2018, now U.S. Pat. No. 10,877,991, entitled "DATA SYNCHRONIZATION IN A DISTRIBUTED DATA STORAGE SYSTEM," which is a U.S. National Phase of PCT/EP2016/078464, filed Nov. 22, 2016, which claims priority to Sweden Application No. 1551528-1, filed Nov. 24, 2015, the contents of which are incorporated by reference in their entirety.

TECHNICAL FIELD

The present disclosure relates to synchronization of data, and in particular continuous synchronization of data between distributed and nonhierarchical nodes in a cluster.

BACKGROUND

In computer systems, where distributed nodes are communicating in a cluster over a communications network and sharing and replicating the same data items or data entities, it is a challenge to keep the data items synchronized, i.e. having the same data item content at each node of the cluster. A cluster is typically a set of nodes that communicate with each other, e.g. over a communications network, and work or process data toward a common goal using the replicated data items, e.g. vehicles belonging to the same fleet of vehicles. A typical conventional method for synchronization is to use a hierarchical client-server configuration, with one server and several clients, where the server maintains a master version of the data items and distributes the data items' values to the different clients when required. Yet another conventional method for synchronization involves statically or dynamically selecting one of the nodes in a cluster as a master, where the master hierarchically performs the function of change acceptance control and decides which changes to the shared data items that are allowed to be made by each node in the cluster. A problem with the above mentioned systems is that they may be vulnerable to faults in the communication path to the server or master. Further, as they may be less flexible they may be unsuitable to situations where nodes frequently disconnect from, or connect to, the cluster.

An alternative to hierarchical node systems is a distributed and nonhierarchical node system. If the node system is truly nonhierarchical, with no static or dynamic selection of one of the nodes as a master, synchronization is however difficult.

US 2008/0168183 describes the use of history information as an aid to synchronization in a peer-to-peer system. The history information includes version vectors that are used to simplify synchronization-related comparisons and create job lists that may be used to bring participating peers into synchronization. US 2008/0168183 describes synchronization between different devices used by the same person, such as e.g. a desktop computer, a laptop computer and a mobile phone.

There is a need for an improved continuous synchronization of data between distributed nodes in a cluster that is flexible, loosely coupled and resilient to faults.

SUMMARY

The present disclosure aims to provide a method of determining the synchronization state between distributed and nonhierarchical nodes communicatively coupled to form a cluster. This is achieved by a method and a distributed and nonhierarchical node as defined in the claims.

The claims define a method wherein a snapshot is generated comprising information relating to the set of data items at a snapshot time $T_s$; said information identifying changes to the data items where each change comprises a time stamp, wherein only changes to the data items with a time stamp $\leq T_0$, where $T_s > T_0$, are included in the snapshot, although changes to the data items up to the time $T_s$ have been received and stored in the nodes, and corresponding generated snapshots are received from all other nodes in the cluster. A synchronization state is then determined based on a comparison between the generated and received snapshots. The synchronization state is determined to be not synchronized if the generated snapshot and the received corresponding snapshots do not all match.

In embodiments, the snapshot time $T_s$ is at least a delay time $T_d$ after $T_0$, i.e. $T_s \geq T_0 + T_d$. In embodiments, the delay time $T_d$ is set to be longer than the maximum transmission delay time between the nodes in the system. The maximum transmission delay time may e.g. be a statistically determined delay time, such as end-to-end delay time, round-trip delay time (RTD) or round-trip time (RTT). In embodiments, $T_0$ is determined in such a way that it for the selected snapshot time $T_s$ represents a corresponding time in all nodes.

The synchronization state may be determined by calculating a checksum based on the information relating to the data items, where the checksum is generated by merging generated and received information, but it may also be determined in other ways, such as by calculating a hash-sum or using an algorithm which calculates a smaller portion of data representing a unique identity of the data items.

In embodiments, the snapshots are generated only if the time stamp of at least one of the data items is older than a predefined snapshot updating time $T_u$. However, the snapshots may instead be generated periodically, and the frequency of generation may be based on the frequency of changes to the data items.

In embodiments, generating a snapshot further comprises obtaining a snapshot time span configuration, and the selection of data items is further based on said snapshot time span configuration, so that only changes to the data items with a time stamp falling within a selected snapshot time span are included in the snapshot. The snapshot time span configuration may comprise multiple non-overlapping snapshot time spans, and a snapshot may be generated and received for each of the multiple snapshot time spans. A synchronization state may be determined for each of the multiple snapshot time spans.

In embodiments, the method further comprises synchronizing the set of data items replicated at each node if the synchronization state is determined to be not synchronized. The synchronization may comprise identifying missing or changed data items and redistributing them among the nodes. The set of data items may be synchronized in such a way that for all non-deleted data items, newer versions of the data items always replace older. The set of data items may further be synchronized in such a way that deleted data items always replace none-deleted, even if they are older. In embodiments, a simulated synchronized state is maintained during the synchronization.

The claims further define a method wherein information regarding missing or changed data items is received from other nodes in the cluster, it is determined that said node is not synchronized with the other nodes in the cluster, and the node is then synchronized with the other nodes in the cluster. In this method, the information regarding missing or changed data items is used to maintain a simulated synchronized state in the node during the synchronization process.

In embodiments, the synchronization comprises identifying missing or changed data items and redistributing them among the nodes. The set of data items may e.g. be synchronized in such a way that for all non-deleted data items, newer versions of the data items always replace older. It may also be synchronized in such a way that deleted data items always replace none-deleted, even if they are older.

In embodiments, the information regarding missing or changed data items is received in the form of snapshots comprising information relating to the set of data items at a snapshot time $T_s$ which are received from all other nodes in the cluster, the information identifying changes to the data items where each change comprises a time stamp, where only changes to the data items with a time stamp$\leq T_0$, where $T_s > T_0$, are included in the snapshot, although changes to the data items up to the time $T_s$ have been received and stored in the nodes. The node is then determined not to be synchronized with the other nodes in the cluster if a corresponding snapshot generated locally in the node does not match all the received snapshots. The synchronization state may be determined by calculating a checksum based on the information relating to the data items, where the checksum is generated by merging generated and received information, but it may also be determined in other ways, such as calculating a hash-sum or using an algorithm which calculates a smaller portion of data representing a unique identity of the data items.

In embodiments, the snapshots are generated only if the time stamps of at least one of the data items is older than a predefined snapshot updating time $T_u$. However, the snapshots may instead be generated periodically, and the frequency of generation may be based on the frequency of changes to the data items.

The claims further define a distributed and nonhierarchical node for synchronizing data between said node and one or more distributed and nonhierarchical nodes communicatively coupled to form a cluster, wherein a set of data items are locally replicated at each node, the node comprising a processor configured to perform the above disclosed method, a memory configured to store and retrieve the set of data items, and a communications interface configured to send or receive data content or parameters to or from the processor to or from other nodes in the cluster.

The claims further define a computer-readable medium on which is stored non-transitory information configured to control a processor/processing unit to perform any of the above disclosed methods.

The claims further define a computer program product comprising code portions adapted to control a processor to perform any of the above disclosed methods.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Introduction

Figure 1:
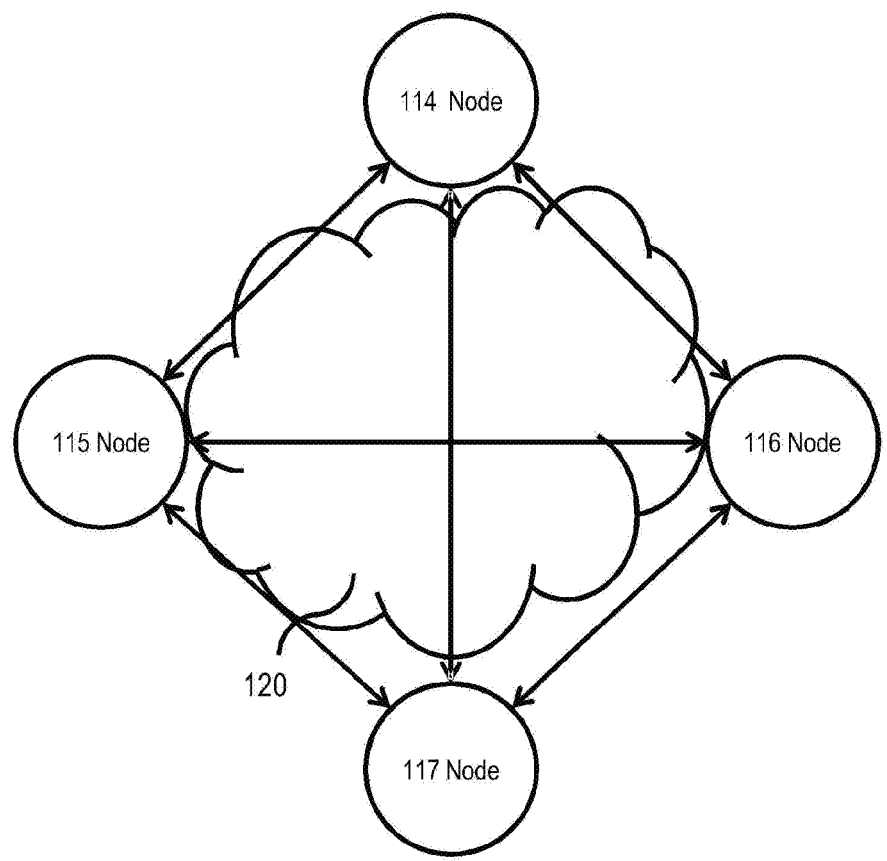
FIG. 1 shows nonhierarchical nodes in a cluster, in accordance with one or more embodiments of the disclosure.

Synchronization techniques used by distributed computer systems tend to be complex and vulnerable to faults. It is therefore desirable to provide an improved system and method for synchronizing replicated data items between distributed nodes that is flexible, loosely coupled and resilient to faults. Further desired improvements include tolerance to dynamic structural changes of the system, e.g. nodes connecting to or disconnecting from the cluster, and capability to handle a high data update frequency from all nodes in the cluster. Nonhierarchical computer systems may be used to describe the properties of node autonomy and decentralization, i.e. the nodes collectively form the computer system without any central coordination.

Such a system may be referred to as a peer-to-peer system, as described in U.S. 200810168183. However, what is described in U.S. 2008/0168183 is a synchronization between different devices used by the same person, such as e.g. a desktop computer, a laptop computer and a mobile phone. In such systems, there are very rarely any issues regarding keeping track of changes occurring in different nodes of the system during the synchronization, since the user will only use one of the devices at a time.

The present disclosure provides a solution where all the nodes, connected in a cluster via a communications network, have nonhierarchical or equal roles, which are flexible, loosely coupled, resilient to faults, tolerant to nodes frequently connecting or disconnecting to/from the cluster, may be able to handle a high number of connected nodes in the cluster and can accept a high data item update frequency. The solution involves detecting if the system is synchronized or not, typically by each node periodically generating a snapshot of its data and comparing it with the snapshots received from the other nodes in the cluster, where each snapshot comprises information relating to the set of data items at a snapshot time $T_s$, said information identifying changes to the data items where each change comprises a time stamp, wherein only changes to the data items with a time stamp≤$T_0$, where $T_s$>$T_0$, are included in the snapshot, although changes to the data items up to the time $T_s$ have been received and stored in the nodes.

If each snapshot is generated and transmitted simultaneously at all nodes, information relating to the change of data item content may have already been received by a first node in the cluster but is still not received by a second node in the cluster due to variations in communication network transmission delay. The present disclosure provides for a method of detecting that the data in the nodes of the cluster is synchronized that overcomes the above mentioned problems by determining a synchronization state based on a snapshot comprising information relating to the set of data items at a snapshot time $T_s$, said information identifying changes to the data items where each change comprises a time stamp, wherein only changes to the data items with a time stamp≤$T_0$, where $T_s$>$T_0$>$T_0$, are included in the snapshot, although changes to the data items up to the time $T_s$ have been received and stored in the nodes, and thus discloses a method for detection of synchronization state and optionally an improved continuous synchronization of data between distributed and nonhierarchical nodes in a cluster that is flexible, loosely coupled and resilient to faults.

Conventional systems using hierarchical nodes suffer from several problems:
- The processing capability and communications network data bandwidth requirement of the server or master increases with the number of nodes in the cluster. Each node will have to communicate with the server or master to synchronize data, e.g. to get approval to make a change to one or more data items.
- Tight coupling to the nodes in the cluster.
- Low resiliency to faults. As all changes to data items are managed by the server or master, the entire synchronization process halts if the communications network connection to the server or master is faulty or disturbed in some way. Returning nodes in the cluster to a synchronized state will take some time, as there may be a backlog of changes in each node that needs to be coordinated by the server or master node.

FIG. 1 shows a distributed and nonhierarchical node system. If the node system is truly nonhierarchical, with no static or dynamic selection of one of the nodes as a master, synchronization is difficult. The present disclosure aims to provide a method of determining the synchronization state between distributed and nonhierarchical nodes communicatively coupled to form a cluster.

System Embodiments

FIG. 1 shows nonhierarchical nodes, e.g. autonomous and decentralized nodes, in a cluster communicating via a communications network 120, in accordance with one or more embodiments of the disclosure. The nodes 114-117 are nonhierarchical as each node individually determines its synchronization state, and the authority, standing, influence, weight or clout of each node is equal, i.e. no single node overrules other nodes. Each node 114-117 in the cluster may generate a snapshot. The snapshot comprises information relating to selected locally replicated data items stored in the node at a snapshot time $T_s$, said information identifying changes to the data items where each change comprises a time stamp, wherein only changes to the data item with a time stamp≤$T_0$, where $T_s$>$T_0$, are included in the snapshot, e.g. comprising all changes to the data items since the previous snapshot was generated but only up to the time $T_0$. $T_0$ is preferably set in a controlled way, so that it is ensured that all nodes have the same reference point, e.g. by determining $T_0$ in such a way that it for the selected snapshot time $T_s$ represents a corresponding time in all nodes. The snapshot time $T_s$ may be at least a delay time $T_d$ after $T_0$, i.e. $T_s$≥$T_0$+$T_d$. The delay time $T_d$ is preferably set to be longer than the maximum transmission delay time between the nodes in the system. Since the data items are selected based on their time stamps, only recent changes (up to the time $T_0$) are considered, although changes to the data items up to the time $T_s$ have been received and stored in the nodes.

One way of determining $T_0$ so that it for a selected snapshot time $T_s$ represents a corresponding time in all nodes is to calculate To according to the following equation:

$$T_0 = T_s - (T_s \bmod T_d) - T_d$$

This forces $T_0$ into a time slot of the length $T_d$, and ensures that $T_0$ falls into the same time slot in all nodes. It is of course also possible to determine $T_0$ in other ways.

Each locally replicated data item or data entity may comprise a unique entity identity (EID), an entity content and a time stamp. Optionally, in embodiments, the data item may further comprise a version identity (VID) and/or a deleted-flag that indicates that the data item is created and exists or that the data item has been deleted but not erased from the memory. The time stamp indicates when the data item was created, updated or deleted. The time stamps do not necessarily represent the actual time—any parameter that indicates the relative time can serve as a time stamp. The nodes may be synchronized so that time stamps generated at the same time in different nodes correspond to each other. Snapshots with information related to the locally replicated data items stored in the node are exchanged between the different nodes 114-117 in the cluster, and a synchronization state is determined based on a comparison between the generated and exchanged snapshots. In embodiments, the generation of snapshots is performed according to a predictable method or algorithm based on the data items such that a snapshot generated will be the same at all nodes in the cluster if the generation is based on the same set of data items.

In embodiments, snapshots are generated periodically and/or based on frequency of changes to the data items. Alternatively, snapshots may be generated only if the time stamps of some of the data items are older than a snapshot updating time $T_u$, older here referring to the time recorded locally in the node. In embodiments, the determination of synchronization state is performed according to a predictable method or algorithm based on generated and received snapshots such that a synchronization state determined will be the same at all nodes in the cluster if the determination is based on identical sets of snapshots. In embodiments, the synchronization state is determined by calculating a checksum based on data items of the snapshots, where the checksum is generated by merging generated and received data items, e.g. by applying XOR to a common attribute of the data items. The synchronization state may be determined in other ways, such as calculating a hash-sum or using an algorithm which calculates a smaller portion of data representing a unique identity of the data items.

The set of data items locally replicated at each node in the cluster may further be synchronized based on the synchronization state, e.g. according to the rules:

Rule 1. A data item is always changed as a whole.
Rule 2. Newer versions of data items replace older.
Rule 3. A predicable selection behavior is needed when data items and/or snapshots have the same time stamp, e.g. the data item and/or the snapshot with the highest or lowest version identity (VID) is selected.
Rule 4. Deleted data items and/or snapshots always replace none-deleted, even if they are older.
Rule 5. Newer versions of deleted data items and/or snapshots replace older deleted versions.

In embodiments, all nodes in the cluster maintain data using exactly the same rules. Rule 3 may be particularly important if the representation of recorded time is of finite resolution. Rule number 4 may be particularly important to avoid having items reappearing after being deleted. Rule number 5 may be particularly important when a snapshot time span configuration comprising multiple non-overlapping snapshot time spans is used, as deleted items may otherwise end up in different snapshot time spans. This could cause a situation where the system falsely seems to be out of sync. Rules 4 and 5 are optional and used only if deleted items are handled.

Figure 2:
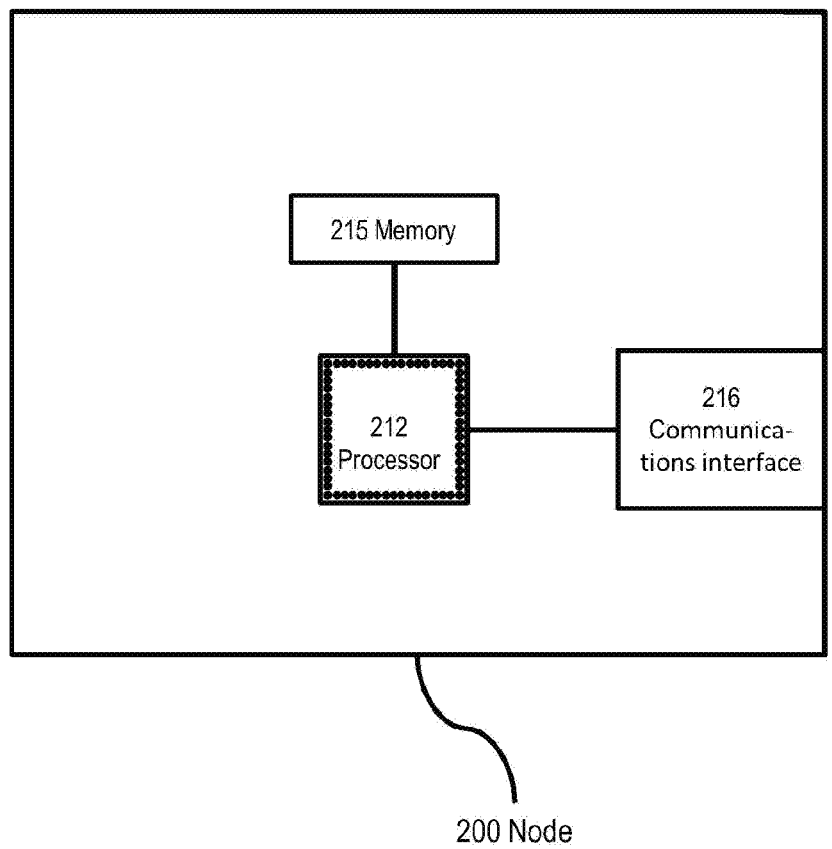
FIG. 2 shows a schematic view of one or more embodiments of a node, in accordance with one or more embodiments of the disclosure.

FIG. 2 shows a schematic view of one or more embodiments of a node 200, in accordance with one or more embodiments of the disclosure, e.g. in the form of a computing device, a laptop computer, a tablet computer, a handheld computer, a wrist-worn computer, a PDA, a smart phone, a telephone, a media player, a game console, a vehicle mounted computer system, a navigation device or a sports exercise monitor. The node comprises a processor/processing unit 212, which is provided with specifically designed programming or program code portions adapted to control the processing unit to perform the steps and functions of one or more embodiments of the method and/or methods described herein. The node 200 further comprises at least one memory 215 configured to store data content and/or parameters, such as data items, received from the processor 212 or to retrieve and send data content and/or parameters to the processor 212. The node further comprises a communications interface 216 which is configured to send or receive data content and/or parameters to or from the processor 212 to or from other nodes in the cluster. In embodiments, the processor 212 is communicatively coupled to the memory 215 and/or the communications interface 216.

Method Embodiments

As previously described in relation to FIG. 1, the present disclosure relates to synchronization of a set of data items between distributed and nonhierarchical nodes arranged in a cluster, communicating via a communications network 120 and sharing and/or replicating the same data items or data instances. A cluster is typically a set of nodes that communicate with each other and cooperate or work towards achieving a common goal or to process a common result using the replicated set of data items or locally stored copies of common data instances, e.g. vehicles belonging to the same fleet of vehicles coordinating efficient delivery or pick-up, robots configured in a factory coordinating production of products or military units coordinating synchronized movement or other actions. It may be difficult to keep the locally replicated set of data items synchronized at each node in the cluster, i.e. having the same version of data items at each node of the cluster. In a non-limiting example, vehicles in a fleet of vehicles may lose wireless network coverage during a period and during this period perform a goods pick-up, that other vehicles are unaware of. In this example, the locally stored or replicated set of data items would indicate that the goods has been collected whereas the stored or replicated set sets of data items of the rest of the vehicles in the fleet would indicate that the goods has not been collected, thus the synchronization state may be said to be "not synchronized". In particular, it may be difficult to detect that nodes of the cluster have versions of the sets of data items locally stored and/or replicated that differ, e.g. to determine a synchronization state as "synchronized" or "not synchronized".

The present disclosure provides nonhierarchical nodes, e.g. autonomous and decentralized, where each node individually determines its local synchronization state and the authority, standing, influence, weight or clout of each node is equal amongst the nodes in the cluster, i.e. no single node overrules other nodes. In embodiments, each data item comprises at least one time stamp indicative of when it was created, updated or deleted. In embodiments, a node in the cluster generates a snapshot which comprises information relating to the set of data items at a snapshot time $T_s$, said information identifying changes to the data items where each change comprises a time stamp, wherein only changes to the data items with a time stamp$\leq T_0$, where $T_d > T_0$, are included in the snapshot, although changes to the data items up to the time $T_s$ have been received and stored in the nodes. The snapshot comprises information, e.g. in the form of metadata, relating to selected locally stored data items stored e.g. in the memory 215 of the node at the point of time the snapshot is generated. The metadata may e.g. comprise the entity identity (EID), the version identity (VID), and the time stamp. In embodiments, snapshots are generated only if at least one of the time stamps is older than a snapshot updating time $T_u$, older here referring to the time recorded locally in the node. In embodiments, snapshots from each respective node connected to the cluster are then received over the communications network 120, where the received snapshots have been generated based on the respective locally stored data items at each node connected to the cluster. In embodiments, the method further comprises determining a synchronization state based on a comparison between the snapshot generated in the node and the snapshots received from the remaining or all other nodes in the cluster.

The set of data items replicated at each node may further be synchronized if the determined synchronization state is determined to be not synchronized. In embodiments, synchronizing the nodes in the cluster may comprise identifying missing or changed data items and redistributing them amongst the nodes. In embodiments, this may further include maintaining a simulated synchronized state during a limited period of time and simultaneously redistributing snapshots or data items in the background. The simulated synchronized state may e.g. be determined by each node sending a missing/changed data items list and receiving generated missing/changed data items lists from all the other nodes in the cluster. A node that is missing data items or changes to them may in this way have enough information about what it is missing to be capable of creating a correct snapshot.

The method in a distributed and nonhierarchical node of synchronizing a set of data items between said node and one or more distributed and nonhierarchical nodes communicatively coupled to form a cluster, wherein the set of data items are locally replicated at each node, which comprises receiving information regarding missing or changed data items from other nodes in the cluster, determining that said node is not synchronized with the other nodes in the cluster, and synchronizing the node with the other nodes in the cluster, wherein the information regarding missing or changed data items is used to maintain a simulated synchronized state in the node during the synchronization process, may also be used independently of the previously described method of determining a synchronization state. As long as it has in some way been determined that the nodes in a cluster of communicatively coupled distributed and nonhierarchical nodes are not synchronized, regardless of how this is done, the method of maintaining a simulated synchronized state during synchronization may be used. Through the use of information regarding missing or changed data items from other nodes in the cluster, it is possible to simulate a synchronized state in the node during the synchronization process. It is then not a problem that the actual synchronization takes some time, because through the simulated synchronized state the system can operate as if it has already been synchronized, and can continuously determine the synchronization state. The information may e.g. be in the form of metadata.

The information regarding missing or changed data items may e.g. be received in the form of snapshots comprising information relating to the set of data items at a snapshot time $T_s$ which are received from all other nodes in the cluster. Said node is in this case determined not to be synchronized with the other nodes in the cluster if a corresponding snapshot generated locally in the node does not match all the received snapshots.

An advantage of the present disclosure is that since the distributed nodes are nonhierarchical and thus loosely coupled, each node can perform the method self-sufficiently regardless if one or more nodes in the cluster connects or disconnects. In one example in a cluster of ten nodes where the tenth node suddenly drops out or disconnects, as each node determines a synchronization state on the generated and received snapshots, the result will be the same at each node as the snapshot from the tenth node will be missing at all nodes. Yet an advantage of at least this embodiment of the present disclosure is that the distributed nodes are nonhierarchical and thus resilient to faults, e.g. communication faults or failures in the communications network. Each node may perform the method self-sufficiently regardless if one or more nodes in the cluster loses communication with other nodes in the cluster. In one example in a cluster of ten nodes where the tenth node suddenly loses communication capability, since each node determines a synchronization state on the generated and received snapshots the result will be the same at each node as the snapshot from the tenth node will be missing at all nodes. Yet an advantage of at least this embodiment of the present disclosure is that the set of data items are replicated at each node of the cluster and thus resilient to faults, e.g. memory faults or other forms of data item loss. A large number of memories, data storage units or entire nodes may fail or be disabled, even simultaneously, without data loss or significant data loss to the cluster as a whole. In one example in a cluster of ten nodes where at least one node have an intact memory or data storage unit, the state of the data items may always be restored, at least up to the last point in time where a synchronized state was detected in the remaining operational node.

Figure 3:
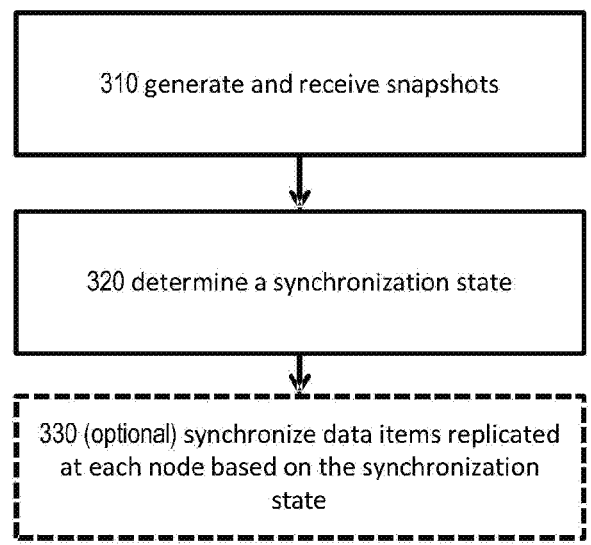
FIG. 3 shows a method in a node communicatively coupled to a cluster of nodes, in accordance with one or more embodiments of the disclosure.

FIG. 3 shows a method in a node communicatively coupled to a cluster of nodes, in accordance with one or more embodiments of the disclosure. In embodiments, a method in a node for synchronizing data between said node and distributed and nonhierarchical nodes communicatively coupled to form a cluster, wherein a set of data items are replicated at each node, comprises:

Step 310: generating a snapshot comprising information relating to the set of data items at a snapshot time $T_s$, said information identifying changes to the data items where each change comprises a time stamp, wherein only changes to the data items with a time stamp$\leq T_0$, where $T_s > T_0$, are included in the snapshot, although changes to the data items up to the time $T_s$ have been received and stored in the nodes, and receiving corresponding generated snapshots from the other nodes in the cluster; and Step 320: determining a synchronization state based on a comparison between the generated and received snapshots.

In embodiments, the generated and received snapshots comprise information regarding changes to the data items where each change comprises a time stamp, e.g. indicative of when the data item was created, updated or deleted. In embodiments, snapshots are generated only if at least one of the data item time stamps is older than a snapshot updating time $T_u$. In an example, determining that the data item time stamps are older is performed by comparing the time stamp to the time recorded in the node and the snapshot updating time $T_u$, e.g. as:

snapshot updating time $T_s \geq$ time stamp

In an exemplary embodiment, the snapshot is generated by merging the set of snapshots and/or data items into a data structure. The synchronization state is further determined by determining that the synchronization state is synchronized if the generated snapshot matches the received snapshots or by determining that the synchronization state is not synchronized if the generated snapshot and the received corresponding snapshots do not all match. One exemplary embodiment of a determined synchronized state is if the locally stored and/or replicated set of data items, on which the generated snapshot is based, and the corresponding sets of data items, stored at the other nodes in the cluster, all match, e.g. have an identical entity identity (EID), content and time stamp, and optionally the same version identity (VID). In embodiments, the EID and the optional VID are unique. In embodiments, the optional VID may be generated by calculating a hash sum or generating a value of some other kind, as would be understood by the skilled person. In embodiments, the EID may be generated by calculating a hash sum or generating a unique value of some kind, as would be understood by the skilled person. In embodiments, the EID and/or VID are unique to the node and/or all the nodes in the cluster. One example of a determined "not synchronized state" is if the local set of data items on which the generated snapshot is based and the corresponding sets of data items stored at the other nodes in the cluster do not all match, and e.g. any of the EID, content and time stamp differ amongst data items locally stored and/or replicated at each node in the cluster. Yet an example of a determined "not synchronized state" is if the local set of data items on which the generated snapshot is based and the corresponding sets of data items stored at the other nodes in the cluster do not all match, and e.g. any of the EID, content and VID differ amongst data items locally stored and/or replicated at each node in the cluster. In yet an embodiment, the generated snapshots comprise information descriptive of the locally replicated set of data items. In yet an embodiment, the generated snapshots comprise a checksum based on the replicated set of data items. In yet an embodiment, the generated snapshots comprise a checksum based on the snapshots. In yet an embodiment, the checksum is based on changes to the data items. In yet an embodiment, the generated snapshots comprise a checksum based on information comprised in the data items. In further embodiments, when a synchronization state is determined that indicates a not synchronized state between the nodes connected to and/or in the cluster, e.g. the data items stored and/or replicated locally at each node do not match, a further method step of synchronizing is performed, i.e. a synchronization scheme is initiated. An advantage of basing the generation of a snapshot on information relating to the data items, such as metadata, is that the amount of data exchanged between the nodes in the cluster is reduced which allows a high data update frequency from all nodes in the cluster and a reduced bandwidth usage in the communications network.

In yet an embodiment, the method in relation to FIG. 3 further comprises an optional step of:

Step 330: synchronizing the set of data items replicated at each node if the synchronization state is determined to be not synchronized.

In one non-limiting example synchronizing the set of data items replicated at each node comprises exchanging information relating to each data item locally stored in each node between the nodes in the cluster in the form of data items and/or snapshots, generating a missing/changed data items list, e.g. indicating which data items the node is missing or has an older version of compared to versions of data items present at other nodes and distributing it to all other nodes in the cluster, receiving missing/changed data items lists from all other nodes in the cluster, generating a data items send list, sending the latest version of data items and/or snapshots to nodes on the data items send list and optionally receiving the latest version of a missing or older version of a data item from other nodes in the cluster. In this way it may be determined that a data item has not been created and is missing, that the data item has an older version or that the node is unaware that a data item has been deleted. Synchronizing the set of data items is further described in relation to FIG. 8.

Figure 4:
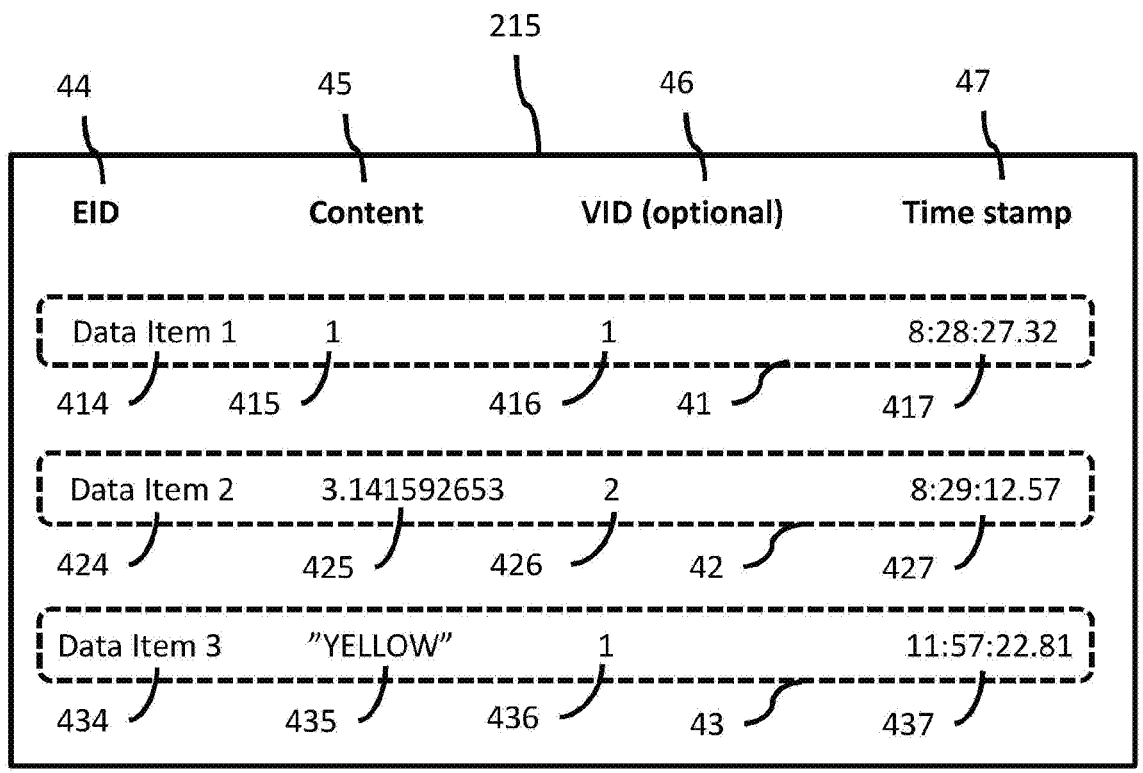
FIG. 4 shows replicated data items stored locally in a memory of a node in a cluster, in accordance with one or more embodiments of the disclosure.

FIG. 4 shows data items stored locally in a memory 215 of a node in a cluster, in accordance with one or more embodiments of the disclosure. In embodiments, each data item may be the smallest possible representation or atomic definition of data locally stored and/or replicated by each node connected to and/or in the cluster and synchronized with other nodes in the cluster. In embodiments, each data item may at least comprise a unique entity identity (EID) 44, an entity content 45 and a time stamp 47. Optionally, in embodiments, the data item may further comprise a version identity (VID) 46 and/or a deleted-flag that indicates that the data item is created and exists or that the data item has been deleted but not erased from the memory 215. There are also a number of other ways of marking a data item as deleted, e.g. by letting a specific data item type represent the deleted item, and allow this data item type to exclude its contents, thus making it smaller.

In embodiments, the entity identity (EID) 44 is set when the data item is first created and uniquely identifies the data item, e.g. such that the data item at a first node can be compared to the same data item at any other node in the cluster. In embodiments, the entity content may be of any data type, e.g. text, integer or floating point number, as would be understood by a skilled person. The entity content is often more than just a single value. It can be any collection of numbers and/or strings and it can include internal objects, even in several levels. The entity content is thus often a complex data structure.

In embodiments, the optional version identity (VID) 46 is initially set when the data item is created, and updated each time the entity content is updated. In embodiments, the optional version identity (VID) uniquely identifies the version of the entity content and is a unique identifier that may be generated by calculating a hash sum or by generating a value of some kind. In a non-limiting example, the VID may be represented by 16 bits, 32 bits, 64 bits, 128 bits or any other number of bits or data representation depending on the application, number of nodes etc. In yet an example, the VID may optionally be randomly generated. In embodiments, the data item time stamp is set to the time recorded by the node when the data item is created, updated or deleted. This may not correspond to the actual time, but may be a time set in the system. The time recorded by each node in the cluster may be synchronized using methods per se known to the person skilled in the art. In embodiments, the optional entity deleted-flag is set to FALSE or 0 (zero) when the data item is created and exists or to TRUE or 1 (one) when the data item has been deleted but not erased from the memory 215. In a non-limiting example, a first data item 41 comprises an EID 414 that is set to a text value of "Data Item 1", an entity content 415 that is set to an integer value of 1, a VID 416 set to integer value of 1 and a time stamp 417 set to "8:28:27.32". In yet a non-limiting example (not shown in FIG. 4), a first data item 41 comprises an EID 414 that is set to a hexadecimal value of 'F4241", an entity content 415 that is set to an integer value of 1, an VID 416 set to a hexadecimal value of "1E8482" and a time stamp 417 set to "8:28:27.32". In yet a non-limiting example, a second data item 42 comprises an EID 424 that is set to a text value of "Data Item 2", an entity content 425 that is set to a floating point number of 3.141592653, a VID 426 set to a value of 2 and a time stamp 427 set to "8:29:12.57". In yet a non-limiting example, a third data item 43 comprises an EID 434 that is set to a text value of "Data Item 3", an entity content 435 that is set to "YELLOW", a VID 436 set to an integer value of 1 and a time stamp 437 set to "11:57:22.81".

Figure 5:
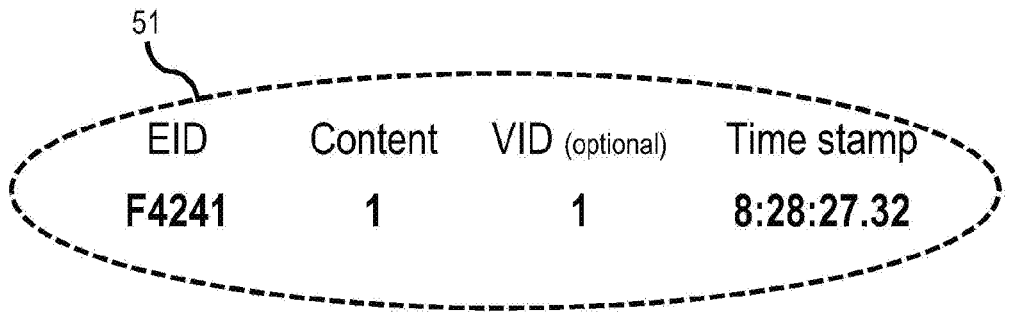
FIG. 5 shows data items, in accordance with one or more embodiments of the disclosure.

In yet an embodiment, the generated snapshot/s comprise information descriptive of the locally replicated set of data items when generating the snapshot. In yet an embodiment, the generated snapshot/s comprise changes to the data items. In yet an embodiment, the generated snapshots comprise a checksum. In yet an embodiment, the checksum is based on the replicated set of data items. In yet an embodiment, the checksum is based on the snapshots. In yet an embodiment, the checksum is based on changes to the data items. In yet an embodiment, the checksum is based on information comprised in the data items. FIG. 5 shows data item is 51-53 in accordance with one or more embodiments of the disclosure. In embodiments, when a data item 51 is created, updated or deleted then a changed data item is generated by the node and distributed over the communications network to all other nodes in the cluster. Likewise, in embodiments, all other nodes in the cluster will generate changed data items and distribute them amongst all the nodes in the cluster such that each node has a set of locally generated changed data items received from all other nodes in the cluster. In embodiments, the snapshots comprise information relating to changes to the data items. As mentioned previously, a data item may comprise a content 45 together with metadata in the form of an EID 44, an optional VID 46 and a time stamp 47. In an example, a data item 51, shown in FIG. 5 as having an EID="F4241", a content=1, a VID=1 and a time stamp="8:28:27.32", is created by the node. Optionally, a flag indicating that the data item is not deleted may be included by setting a deleted-flag to 0 or Boolean FALSE. In yet an example, when the data item is updated by the node, an updated data item 52 is created, shown in FIG. 5 as having an EID="F4241", a content=0, a VID=2 and a time stamp="10:52:12.89". Optionally, a flag indicating that the data item is not deleted may be included by setting a "deleted" flag to 0 or Boolean FALSE. In yet an example, when the data item is deleted by the node, a data item 53 is created, shown in FIG. 5 as having an EID="F4241", a content=0, a VID=2 and a time stamp="11:28:27.32". Optionally, a flag indicating that the data item is deleted may be included by setting a "deleted" flag to 1 or Boolean TRUE.

In embodiments, generating a snapshot 310 comprises retrieving the content of all locally stored or replicated data items and merging them to generate a snapshot. In yet an embodiment, generating a snapshot comprises retrieving the entity identity (EID) of all locally replicated data items and merging them to generate a snapshot. In one example, generating a snapshot comprises retrieving the version identity (VID) of all locally stored data items and merging them to generate a snapshot. In one example, generating a snapshot comprises retrieving the time stamp of all locally stored data items and merging them to generate a snapshot. In yet an example, generating a snapshot comprises retrieving any of EID and/or VID and/or the time stamp of all locally stored data items and merging them to generate a snapshot. In further embodiments, merging data items to generate a snapshot further comprises applying a logical operator to the data items, such as exclusive or (XOR), to generate a snapshot in the form of a checksum, e.g. to apply XOR to the VID of all retrieved data items. Other ways of merging the data, such as calculating a hash-sum, may also be used.

As mentioned previously, generating snapshots at all nodes in the cluster may be a complicated task, as the state of the shared and/or replicated set of data items differs between nodes due to transmission delay. For example, if the snapshot is generated simultaneously at all nodes, information relating to changed data items may have already been received by one node in the cluster but is still not received by a second node in the cluster due to communication network transmission delay. The snapshots will then indicate that the set of data items locally stored and/or replicated at each node are not synchronized, although they will be shortly after. The present disclosure provides for a method of eliminating and/or reducing the influence of varying transmission delay on the step of generating a snapshot by determining a synchronized state based on selected data items generated based on changes to the data items up to a certain point of time $T_0$, since only changes to the data items with a time stamp $\leq T_0$, where $T_s > T_0$, are included in the snapshot, although changes to the data items up to the time $T_s$ have been received and stored in the nodes. The snapshot time $T_s$ may be at least a delay time $T_d$ after $T_0$, i.e. $T_s \geq T_0 + T_d$. The delay time $T_d$ may e.g. be set as a statistically determined maximum transmission delay time in the system. In embodiments, the transmission delay may be determined or estimated as end-to-end delay time, round-trip delay time (RTD) or round-trip time (RTT). In embodiments, the transmission delay may be determined or estimated based on a communication network model.

By generating a snapshot based on selected data items with a time stamp $\leq T_0$, the influence on the generated snapshot of varying transmission delay time between nodes in the cluster may be reduced, thus improving synchronization of distributed nodes in a cluster. The delay time $T_d$ may e.g. calculated as a statistical measure such as max, min, average, standard deviation of the transmission delay.

Figure 6:
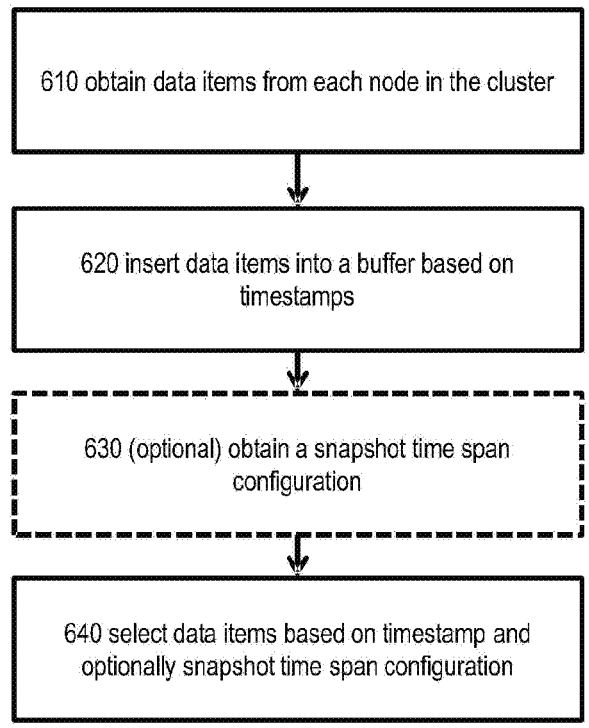
FIG. 6 shows yet a method in a node communicatively coupled to a cluster of nodes, in accordance with one or more embodiments of the disclosure.

FIG. 6 shows yet a method in a node communicatively coupled to a cluster of nodes, in accordance with one or more embodiments of the disclosure. In further embodiments herein, generating a snapshot 310 further comprises:

Step 610: generating and receiving snapshots by obtaining data items from each node in the cluster, wherein each snapshot comprises data indicative of changes to the set of data items and wherein each data item comprises a time stamp;

Step 620: inserting the data items into a buffer;

Step 640: selecting data items from the buffer based on the time stamps comprised in the data items; wherein the snapshot is based only on the selected data items.

In embodiments, the complexity of the selection of data items from the buffer can be further reduced by introducing an ordered buffer such that all the selected data items are in adjacent positions in the buffer. In embodiments, the buffer is an ordered buffer, and the data items are ordered based on the time stamp comprised in the data item in ascending order or descending order.

In embodiments, data items are further selected using snapshots having different time spans based on a snapshot time span configuration. In embodiments, generating a snapshot 310 comprises selecting data items from a buffer and merging them to generate a snapshot. In yet an example, generating a snapshot comprises merging the entity identity (EID) of all data items and merging them to generate a snapshot. In yet an example, generating a snapshot comprises merging the version identity (VID) of all selected data items and merging them to generate a snapshot. In yet an example, generating a snapshot comprises merging the time stamps of all selected data items to generate a snapshot. In yet an example, generating a snapshot comprises merging the EID and/or VID and/or the time stamp of all selected data items to generate a snapshot. In further embodiments, merging data items to generate a snapshot further comprises applying a logical operator to the selected data items, such as exclusive or (XOR), to generate a snapshot, e.g. to apply XOR to the EID, VID or time stamp of all selected data items. Other ways of merging the data, such as calculating a hash-sum, may also be used.

In embodiments, all nodes in the cluster will generate and/or log changes to the data items each time the locally replicated set of data items are changed, e.g. by the processor performing other method steps, not related to the methods described herein. Such other method steps may be obtaining the current position, velocity, air pressure or performing any other method step related to the current application of the nodes in the cluster.

In yet an embodiment, the time stamp is set or assigned to the data item when the change to the data item is made. In embodiments, each time a data item is created, or deleted, or updated by changing the content, which leads to VID and/or time stamp changes, a changed data item is generated and distributed to the other nodes in the cluster via the communications network 120.

The snapshot time span configuration may in an optional step be obtained as predetermined, stored in memory of the node and/or requested and/or received from any of the other nodes in the cluster.

In further embodiments, generating a snapshot may further comprise:

Step 630: obtaining a snapshot time span configuration.

Figure 7:
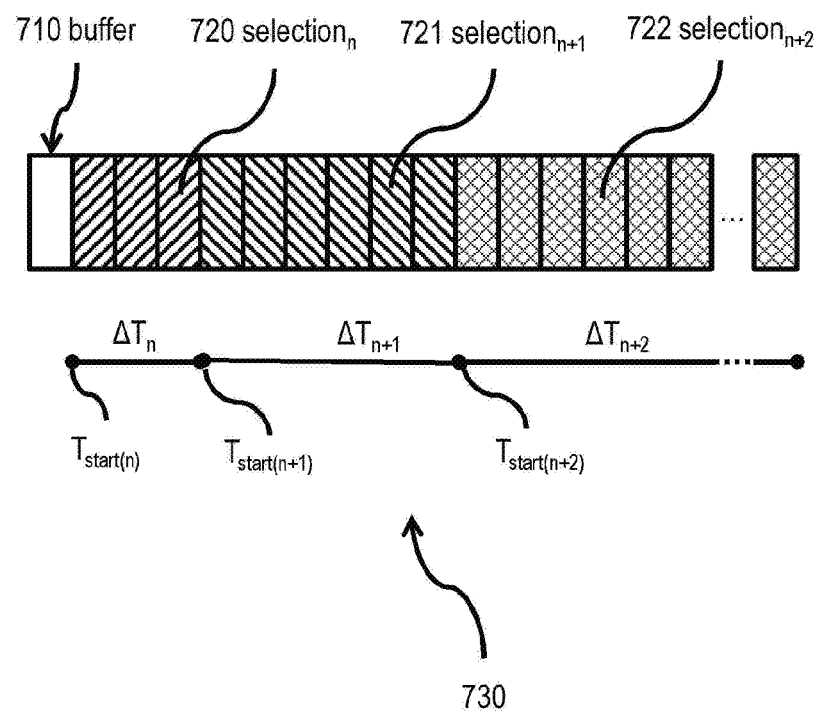
FIG. 7 shows a snapshot time span configuration, in accordance with one or more embodiments of the disclosure.

FIG. 7 shows a snapshot time span configuration 730 in accordance with one or more embodiments of the disclosure. In embodiments, the snapshot time span configuration 730 comprises a number of snapshot time spans ΔT, each beginning at a snapshot start time $T_{start}$.

In embodiments, data items are continuously obtained, e.g. generated by the node or received from other nodes in the cluster, and inserted into a buffer 710 based on the time stamp of each data item, e.g. in random order, ascending order or descending order, as the respective set of data items are created, updated or deleted. In further embodiments, a snapshot time span configuration 730 is obtained e.g. as predetermined, determined or as retrieved from memory 215. In embodiments, the snapshot time span configuration 730 comprises a number of snapshot time spans ΔT, each having a snapshot start time $T_{start}$, where implicitly a snapshot stop time (not shown in the figure) can be calculated as snapshot start time $T_{start}$+snapshot time span ΔT. In further embodiments, data items are selected from the buffer based on the snapshot time span configuration 730 by selecting the data items that comprise a time stamp that falls within the snapshot time span ΔT.

In embodiments, the snapshot time span configuration 730 comprises multiple non-overlapping snapshot time spans ΔT, wherein a snapshot is generated and received for each of the multiple snapshot time spans ΔT. In embodiments, the snapshot time span $\Delta T_{n+1}$ of the following snapshot is doubled in relation to the previous snapshot's time span $\Delta T_n$. In a non-limiting example, the multiple non-overlapping snapshot time spans ΔT in a snapshot time span configuration 730 comprises a first snapshot time span $\Delta T_n$, second snapshot time span $\Delta T_{n+1}$ and a third snapshot time span $\Delta T_{n+2}$, where the first snapshot time span $\Delta T_n$ is two seconds, the second snapshot time span $\Delta T_{n+1}$ is four seconds and the third snapshot time span $\Delta T_{n+3}$ is eight seconds.

In embodiments, the snapshot time span configuration 730 defines and/or comprises multiple non-overlapping snapshot time spans ΔT, each paired with a snapshot start time $T_{start}$, e.g. ($\Delta T_n$, $T_{start(n)}$), ($\Delta T_{n+1}$, $T_{start(n+1)}$) and ($\Delta T_{n+2}$, $T_{start(n+2)}$), where implicitly snapshot stop times (not shown in the figure) can be calculated as snapshot start time $\Delta T_{start}$+snapshot time span ΔT. In embodiments, non-overlapping snapshot time spans are defined with snapshot start time and snapshot stop time such that the time stamps of selected data items always fall within one and only one snapshot time span. In further embodiments, data items are selected as multiple selections of data items, e.g. selection$_n$, 720, selection$_{n+1}$ 721, selection$_{n+2}$ 722, from the buffer based on the snapshot time span configuration 730 of snapshot time spans and the time stamps comprised in the data items for each snapshot time span comprised in the snapshot time span configuration 730. The data items in each selection may comprise a time stamp that falls within the respective snapshot time span $\Delta T_n$, $\Delta T_{n+1}$, $\Delta T_{n+2}$. In embodiments, a snapshot is generated based on each of the multiple selections 720, 721, 722 of data items from the buffer 710.

In embodiments, to further improve the determination of a synchronization state, a synchronization state history can be determined by including multiple non-overlapping snapshot time spans comprised in the snapshot time span configuration 730 and further generating and receiving snapshots for each of the multiple selections of the non-overlapping snapshot time spans comprised and/or defined in the snapshot time span configuration 730. The snapshots generated by the node for each of the multiple non-overlapping snapshot time spans can then be compared to the corresponding snapshots for each of the multiple non-overlapping snapshot time spans generated by and/or received from all the other nodes in the cluster. In embodiments, the snapshots are compared progressively from the snapshot time span with the snapshot start time $T_{start}$ nearest to the time recorded in the node, e.g. time span $\Delta T_n$, to the snapshot time span with the snapshot start time $T_{start}$ furthest from the time recorded in the node, e.g. time span $\Delta T_{n+2}$. Thereby the last point in time, represented by the respective snapshot, where the sets of data items replicated by each node in the cluster were synchronized, can be determined as a synchronization time span, and the number of data items that need to be exchanged between the nodes in the cluster can be reduced and/or minimized.

In embodiments, a snapshot is generated by the node and received from each of the other nodes in the cluster for each of the multiple non-overlapping snapshot time spans comprised and/or defined in the snapshot time span configuration 730.

Returning now to synchronizing the set of data items replicated at each node, as further described in relation to Step 330 in FIG. 3. In embodiments, when the determined synchronization state is "not synchronized", as described in relation to step 320 in FIG. 3, a synchronization procedure for synchronizing data items replicated at each node is triggered or started amongst all the nodes in the cluster. In embodiments, the synchronization procedure optionally starts by determining a synchronization time span, e.g. one or multiple snapshot time spans defined or comprised in the snapshot time span configuration. In embodiments, a list of data items comprising a time stamp that falls within the determined time span is generated by each node in the cluster. In embodiments, the generated list of data items is exchanged with all other nodes in the cluster, i.e. the node sends the generated list of data items and receives generated lists of data items from each node in the cluster. In embodiments, the node compares the received lists of data items from all other nodes in the cluster to the locally replicated set of data items in the node and generates a missing/changed data items list. In an example, the reason for change to the data items may be that the data item was never created at the node, the node had a data item with an older time stamp or version identity (VID) or the node was unaware that the data item had been deleted at one or more of the other nodes in the cluster. In embodiments, the missing/changed data items list is further exchanged with all other nodes in the cluster, i.e. the node sends the generated missing/changed data items list and receives generated missing/changed data items lists from each node in the cluster. In an example, a node that is missing changes to data items now has enough information about what it is missing to be capable of creating correct snapshots. The missing/changed data items list may comprise the data items themselves, or just the information relating to the data items.

During a limited time the node can now simulate a synchronized state when generating the snapshot. In embodiments, in an optional method step, the node compares the received missing/changed data items lists to the locally replicated set of data items in the ordered buffer and generates a data items send list for one or more nodes in the cluster. At this point all participants are aware of what to resend to restore all nodes in the cluster to a synchronized state. In embodiments, in an optional method step, each node in the cluster will start sending data items to one or more nodes in the cluster that are comprised in the respective data items send list. In embodiments, each node will use a random order of the respective data items send list to reduce the risk of duplicates being sent by multiple nodes. In an example, as the sending of data items from the send list can take a long time to execute, it is desired to be able to detect any new unsynchronized situation simultaneously, which is possible during the correct snapshot simulation. An optional step of removing every data item received from other nodes from the data items send list may be included, thereby reducing the risk of distributing a data item twice.

When the snapshot time span configuration comprises multiple snapshot time spans, a snapshot may be generated by the node for each of the snapshot time spans, and be compared to the corresponding snapshots received from all the other nodes in the cluster. If the snapshots are compared progressively from the most recent snapshot time span, the last time span $\Delta T_l$, when the sets of data items replicated by each node in the cluster were synchronized can be determined. The synchronization time span can then be set to comprise this time span $\Delta T_l$, which means that data items which have not been changed after the start of this time span $\Delta T_l$ do not have to be exchanged. This reduces the number of data items that need to be exchanged between the nodes in the cluster, and thus also reduces the bandwidth used for the synchronization.

Figure 8:
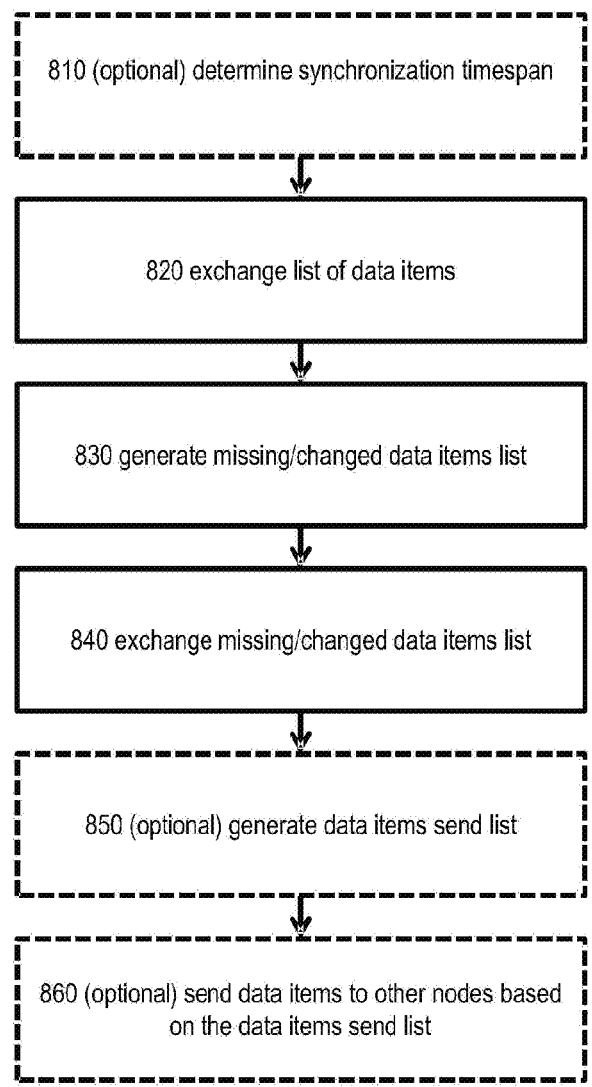
FIG. 8 shows yet a method in a node communicatively coupled to a cluster of nodes, in accordance with one or more embodiments of the disclosure.

FIG. 8 shows yet a method in a node communicatively coupled to a cluster of nodes, in accordance with one or more embodiments of the disclosure, where the method described in relation to step 330 of FIG. 3 further comprises a synchronization procedure comprising the steps:

Step 820: exchange list of snapshots and/or data items.
Step 830: generate missing data items lists.
Step 840: exchange missing data items lists.

The synchronization may take place with or without a snapshot time span configuration. In embodiments, the method further comprises an optional:

Step 810: determine a synchronization time span.

In embodiments, the synchronization time span comprises one or more consecutive snapshot time spans from the snapshot time span configuration. In an example, snapshots for multiple snapshot time spans defined or comprised in the snapshot time span configuration are generated at each node, exchanged and compared to determine the time span or time period for which the nodes in the cluster are not synchronized, e.g. the snapshot from each node do not match for one or more consecutive snapshot time spans. In yet an example, the synchronization time span is defined by five consecutive snapshot time spans in a snapshot time span configuration. The determined synchronization state for snapshots within snapshot time spans 3-5 indicates a synchronized state and the determined synchronization state for snapshots within snapshot time spans 1-2 indicates a non-synchronized state. The synchronization time span may then be determined by merging snapshot time spans 1-2, thus eliminating the need to exchange snapshots and/or data items and/or checksums with a time stamp falling within snapshot time spans 3-5.

In an exemplary embodiment, the synchronization time span or time period is determined by selecting one snapshot time span from the snapshot time span configuration, as further described in relation to FIG. 7, e.g. by selecting snapshot start time=$T_{start}$ and snapshot stop time=$T_{start}+\Delta T$. In an exemplary embodiment, the synchronization time span or time period is determined by selecting one snapshot time span or multiple consecutive snapshot time spans from the snapshot time span configuration, e.g. by merging snapshot time spans $\Delta T_n$-$\Delta T_{n+2}$ by selecting snapshot start time=$T_{start}$ and snapshot stop time=$T_{start}+\Delta T_n+\Delta T_{n+1}+\Delta T_{n+2}$. In embodiments, any other suitable synchronization time span may be selected.

In further embodiments, the method further comprises an optional:

Step 850: generate data items send list.

In further embodiments, the method further comprises an optional:

Step 860: sending data items to other nodes based on the data items send list.

Figure 9:
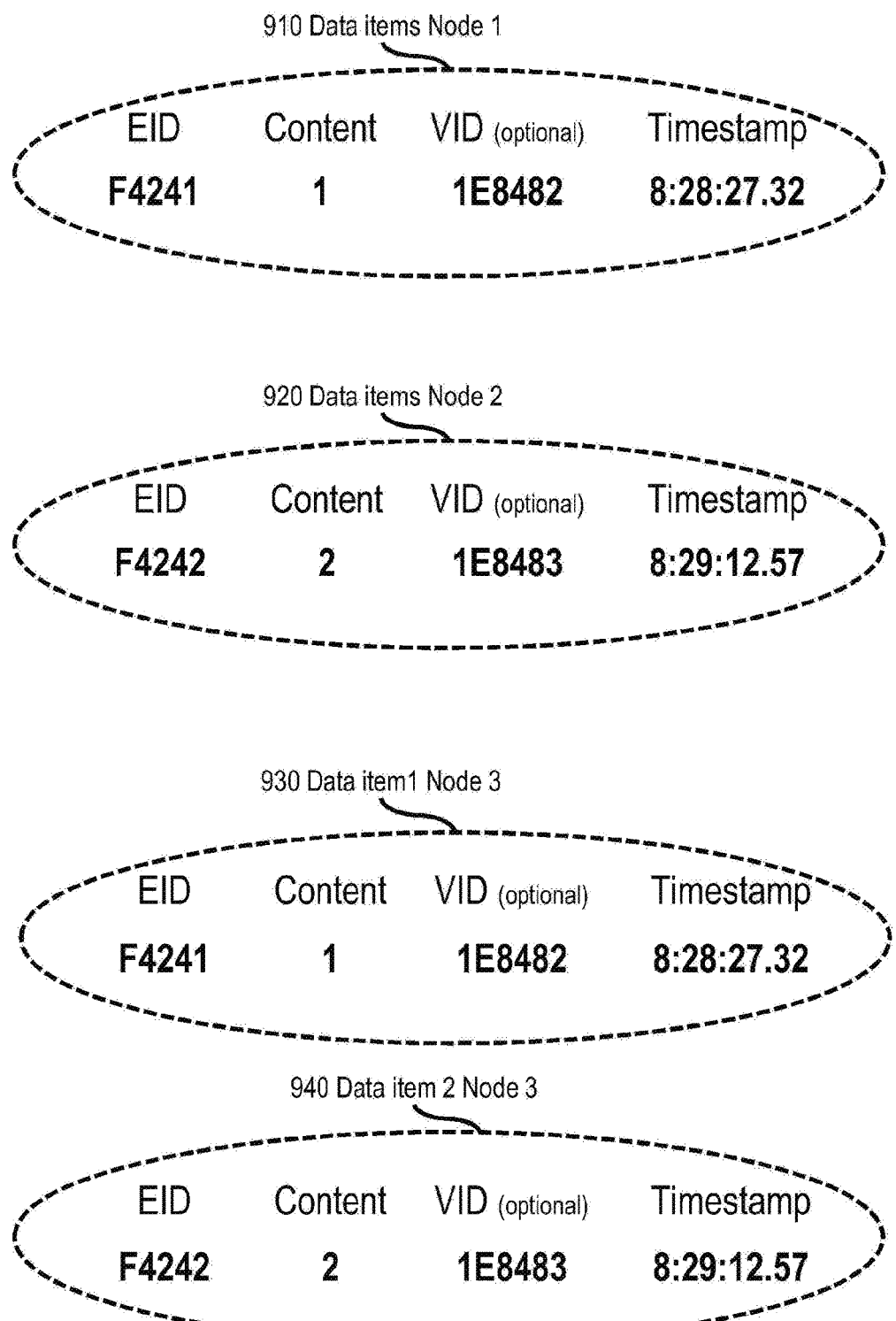
FIG. 9 shows replicated sets of data items in a cluster of three nodes, in accordance with one or more embodiments of the disclosure.

FIG. 9 shows replicated sets of data items in a cluster of three nodes, in accordance with one or more embodiments of the disclosure. In an exemplary embodiment, three distributed and nonhierarchical nodes are connected in a cluster over a communications network. The first node comprises a single data item 910. The data item comprises an EID="F4241", a content=1, an optional VID="1E8482" and a time stamp="8:28:27.32". The second node comprises a single data item 920. The data item comprises an EID="F4242", a content=2, an optional VID="1E8483" and a time stamp="8:29:12.57". The third node comprises two data items 930, 940. The first data item 930 comprises an EID="F4241", a content=1, an optional VID="1E8482" and a time stamp="8:28:27.32". The second data item 940 comprises an EID="F4242", a content=2, an optional VID="1E8483" and a time stamp='8:29:12.57". After determining a synchronization state, e.g. as "not synchronized", based on the generated and received snapshots, the synchronization procedure may be initialized by generating, at each node, a "missing/changed list" and a "send list", as further described in relation to FIG. 10 and FIG. 11.

Figure 10:
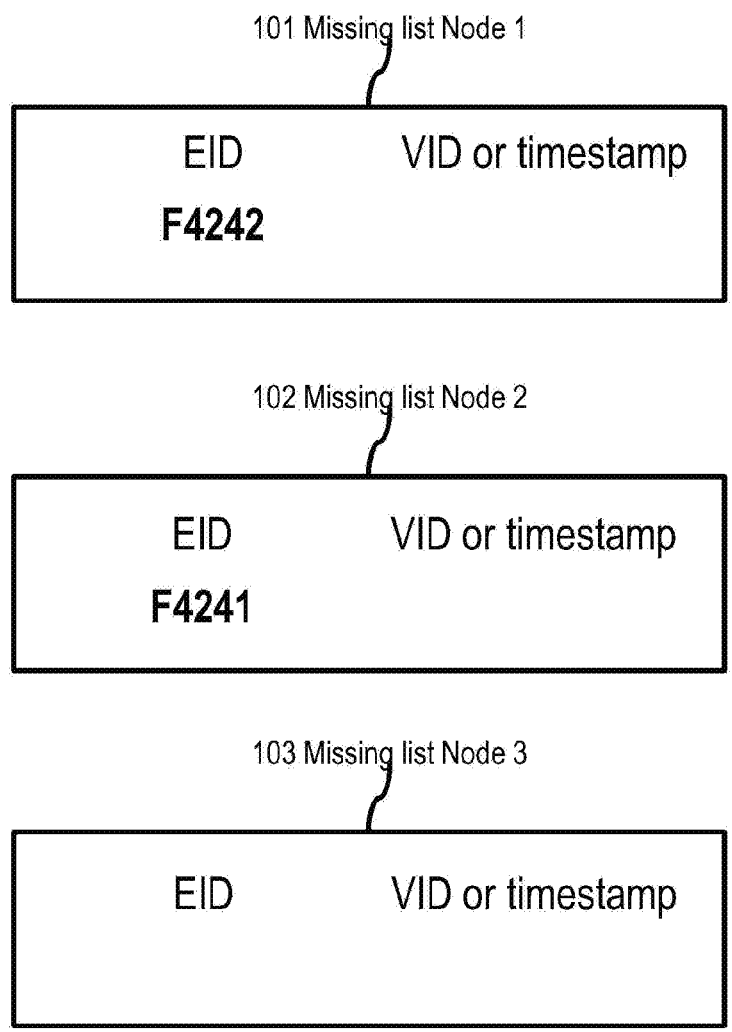
FIG. 10 shows missing data items lists, in accordance with one or more embodiments of the disclosure.

FIG. 10 shows a missing/changed data items lists in accordance with one or more embodiments of the disclosure. In embodiments, each of the nodes compares the generated and received snapshots to the locally stored and/or replicated set of data items and compiles a missing/changed data items list comprising data items that are missing or where an older version is stored locally compared to what the snapshots indicate. The first node generates a first missing/changed data items list 101 comprising at least an EID="F4242". VID or time stamp of the data item may be included as columns in the missing/changed data items list. The second node generates a first missing/changed data items list 102 comprising at least an EID="F4241". The third node generates an empty list 103, as the latest versions are available at the node. In embodiments, the missing/changed data items lists may then be exchanged and/or distributed amongst all nodes in the cluster. In an example, typical causes for entering a data item onto the missing/changed data items lists:

New—the node did not have it at all.
Updated—the node had an older version.
Deleted—the node was unaware that it had been deleted by another node in the cluster.

Figure 11:
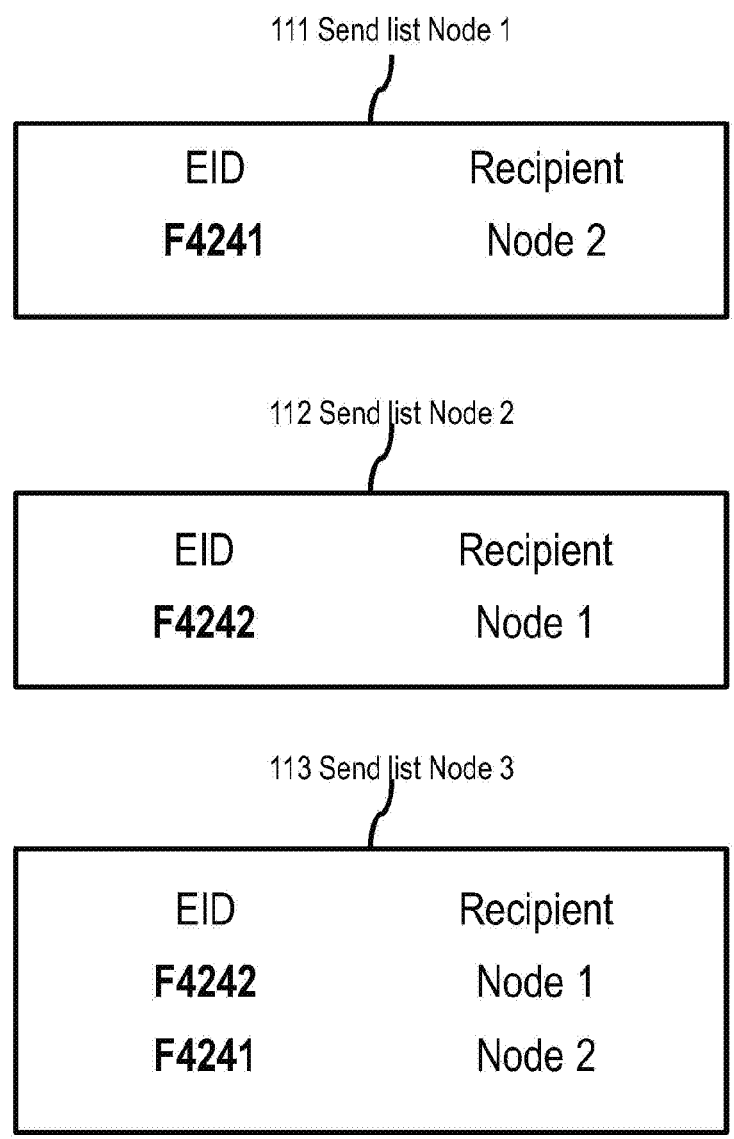
FIG. 11 shows data items send lists, in accordance with one or more embodiments of the disclosure.

FIG. 11 shows data items send lists in accordance with one or more embodiments of the disclosure. In embodiments, each of the nodes compares the received missing/changed data items lists to the locally stored and/or replicated set of data items and compiles a data items send list. In an example, Node 1 generates a data items send list 111 indicating that the data item with EID="F4241" should be sent to Node 2 as recipient. In yet an example, Node 2 generates a data items send list 112 indicating that the data item with EID="F4242" should be sent to Node 1 as recipient. In yet an example, Node 3 generates a data items send list 113 indicating that the data item with EID="F4242" should be sent to Node 1 as recipient and that the data item with EID="F4241" should be sent to Node 2 as recipient. In embodiments, after the missing/changed data items lists and the data items send lists have been compiled, a simulated synchronized state of the data items may be generated, e.g. by assuming that all data items have been distributed according to the data items send lists. The synchronization procedure may continue in the background, whilst generating and receiving snapshots, step 310 in FIG. 3, and determining a synchronization state, step 320 in FIG. 4, may be performed based on the simulated state. After generating missing/changed data item lists and data items send lists, all nodes in the cluster are aware of what to resend to restore a synchronized state. Furthermore, a participant that is missing data items now has enough information about what it is missing to be capable of generating correct snapshots and/or checksums. During a limited time the participant can now simulate a synchronized state. This can safely be done during redistribution of missing data items. In embodiments, after a timer expires the simulated state is abandoned. As the redistribution of missing/changed data items can take a long time to execute, it is desired to be able to detect any new unsynchronized situation simultaneously, which is possible during the simulated synchronized state. In embodiments, to reduce the risk of redundant resending of missing/changed data items, the sending node should use a random selection of next data item to send. The sending node should also remove every resent data item from the data items send list. As data items can be altered at any time, a node should always send the latest version of it.

Further advantages of embodiments of the disclosure include:

The node and method is flexible as any type of data may be held or stored in the data item.

Allows the network topology to be divided into domains.

Allows any distributed and nonhierarchical network topology.

Is compatible with other technologies, such as databases.

May be implemented with nearly any protocol, such as TCP or CAN-bus.

Other Embodiments

The processor of the described node is in accordance with one or more embodiments configured to perform a selection of any or all of the method steps described herein that are associated with synchronizing nodes.

In one or more embodiments, there is provided a computer-readable medium on which is stored:

non-transitory information for performing a method according to any of the embodiments described herein; and/or non-transitory information configured to control a processor/processing unit to perform any of the steps or functions of embodiments described herein.

In one or more embodiments, there is provided a computer program product comprising code portions adapted to control a processor to perform any of the steps or functions of any of the embodiments described herein. Software in accordance with the present disclosure, such as program code portions and/or data, can be stored in non-transitory form on one or more machine-readable mediums. It is also contemplated that software identified herein can be implemented using one or more general purpose or specific purpose computers and/or computer systems, networked and/or otherwise.

Where applicable, one or more embodiments provided by the present disclosure can be implemented using hardware, software, or combinations of hardware and software. Also where applicable, the various hardware components and/or software components set forth herein can be combined into composite components comprising software, hardware, and/or both. Where applicable, the various hardware components and/or software components set forth herein can be separated into sub-components comprising software, hardware, or both. In addition, where applicable, it is contemplated that software components can be implemented as hardware components, and vice-versa. Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. A method in a distributed and nonhierarchical node for synchronizing a set of data items between said node and one or more distributed and nonhierarchical nodes communicatively coupled to form a cluster, wherein the set of data items are locally replicated at each node, the method comprising:

receiving information regarding missing or changed data items from other nodes in the cluster;

determining that said node is not synchronized with the other nodes in the cluster; and synchronizing the node with the other nodes in the cluster, wherein the information regarding missing or changed data items is used to maintain a simulated synchronized state in the node during the synchronization process.

2. The method of claim 1, wherein the synchronization comprises identifying missing or changed data items and redistributing them among the nodes.

3. The method of claim 1, wherein the set of data items is synchronized in such a way that for all non-deleted data items, newer versions of the data items always replace older.

4. The method of claim 1, wherein the set of data items is synchronized in such a way that deleted data items always replace none-deleted, even if they are older.

5. The method of claim 1, wherein the information regarding missing or changed data items is received in the form of snapshots comprising information relating to the set of data items at a snapshot time $T_s$ which are received from all other nodes in the cluster, said information identifying changes to the data items where each change comprises a time stamp, where only changes to the data items with a time stamp $\leq T_0$, where $T_s > T_0$ and $T_0$ is determined in such a way that it for the selected snapshot time $T_s$ represents a corresponding time in all nodes, are included in the snapshot, although changes to the data items up to the time $T_s$ have been received and stored in the nodes, and said node is determined not to be synchronized with the other nodes in the cluster if a corresponding snapshot generated locally in the node does not match all the received snapshots.

6. The method of claim 5, wherein $T_0$ is calculated according to the equation $T_0 = T_s - (T_s \bmod T_d) - T_d$, where $T_d$ is a delay time set to be longer than the maximum transmission delay time between the nodes in the system.

7. The method of claim 5, wherein the synchronization state is determined by calculating a checksum based on said information relating to said data items, where the checksum is generated by merging generated and received information.

8. The method of claim 5, wherein the snapshots are generated only if the time stamps of at least one of the data items is older than a predefined snapshot updating time $T_u$.

9. The method of claim 5, wherein the snapshots are generated periodically, the frequency of generation being based on the frequency of changes to the data items.

* * * * *